United States Patent [19]

Eldridge et al.

[11] 4,397,366
[45] Aug. 9, 1983

[54] AIR CUSHION VEHICLES

[75] Inventors: Michael W. Eldridge, Cowes; John E. Dadswell, Newport, both of Great Britain

[73] Assignee: British Hovercraft Corp. Ltd., Yeovil, England

[21] Appl. No.: 349,609

[22] Filed: Feb. 17, 1982

[30] Foreign Application Priority Data

Feb. 20, 1981 [GB] United Kingdom ............... 8105517

[51] Int. Cl.³ .............................................. B60V 1/18
[52] U.S. Cl. ................... 180/116; 114/67 A
[58] Field of Search ............. 180/116, 126, 117, 118, 180/119, 120, 121, 122, 123, 124, 125, 127, 128, 129, 130; 296/193; 114/65 R, 67 A, 356

[56] References Cited

U.S. PATENT DOCUMENTS 3,598,077 8/1971 Veldhuizen ..................... 114/67 A
4,069,634 1/1978 Bouter et al. ..................... 180/116

Primary Examiner—John A. Pekar
Assistant Examiner—D. Lynn Fugate
Attorney, Agent, or Firm—Larson and Taylor

[57] ABSTRACT

Bow and side deck structures forming a part of the rigid body structure of an air cushion vehicle include a tubular circular section gunwale member and a tubular circular section chine member supported outwardly from a buoyancy tank structure which forms the base of the rigid body structure by frame members to which they are attached by welding. The bow and side deck structures are completed by hull plating attached to the gunwale, chine and frame members. The buoyancy tank structure may include unstiffened extruded deep I-section beams.

10 Claims, 6 Drawing Figures

AIR CUSHION VEHICLES

This invention relates to air cushion vehicles (A.C.V.) and is particularly concerned with structure forming a part of the rigid body of an A.C.V.

Historically, amphibious A.C.V.'s have generally come out of an aircraft background so that structural design and manufacture has followed aircraft practices with spars, frames, stiffeners and skins usually being fastened to each other by mechanical fastening techniques such as rivetting or bolting. This adds to both the weight and cost of the A.C.V.

A particular disadvantage of this practice is to be found in manufacture of an A.C.V. having a continuously curved planform at the bow with the structure sloping downwardly and inwardly from the gunwale to the chine. Frame members projecting radially from attachment to the forward end of the buoyancy tank structure have to be individually formed to connect with gunwale and chine spar members because their angles of projection continuously change around the bow. Furthermore, stiffeners disposed between the frame members and extending between attachment at their ends to the gunwale and chine spar members, have to be individually cropped at their ends so as to be suitably angled for matching with the gunwale and chine spar members.

Another disadvantage is that the buoyancy tank structure is costly and time-consuming to manufacture. Beam members providing the main structural strength of the buoyancy tank are fabricated from sheet material joined by mechanical fastening techniques and suitably stiffened. Panels, usually of sandwich construction, attached to the beam members, have to be sealed with suitable sealants so as to stop the ingress of water into the buoyancy tank structure.

The present invention aims to provide a lightweight structure which is able to withstand high impact loading whilst being inexpensive to manufacture in comparison with previous amphibious A.C.V. structures.

According to the present invention an amphibious air cushion vehicle has a rigid body structure including a rigid base formed as a bouyancy tank structure, a bow structure attached to and extending outwardly from one end of the buoyancy tank structure, side deck structures attached to and extending outwardly from each longitudinal side of the buoyancy tank structure, the bow structure and side deck structures each comprising a tubular circular section gunwale member and a tubular circular section chine member, each supported outwardly from the buoyancy tank structure by frame members spaced from each other along the length of the gunwale and chine members and attached thereto by welding, and hull plating attached to and supported by the gunwale, chine, and frame members.

Preferably, the chine member extends in a continuous curve around the bow structure and along the full length of the longitudinal sides of the A.C.V. However, the gunwale member, whilst extending in a continuous curve around the bow structure, may extend along only part of the length of the longitudinal sides of the A.C.V., and the side deck structure may be of reduced depth aft of the termination of the gunwale member.

The buoyancy tank structure of the A.C.V. preferably comprises a plurality of unstiffened extended beams of deep I-section extending transversely of the buoyancy tank structure and based from each other throughout the length of the buoyancy tank structure, tank plating being attached to the beams to form a closed box structure. Preferably, the ends of the extruded beams project outwardly of the tank plating forming the closed longitudinal sides of the buoyancy tank structure, and at least in the forward half of the buoyancy tank structure the ends of the beams are attached to the frame members of the side deck structure.

At least around the bow structure stiffener members may be disposed between each pair of frame members so as to extend between welded attachment at their ends to the gunwale and chine members. At the position of each stiffener member two further stiffeners may extend one from the gunwale member and one from the chine member inwardly towards the central buoyancy tank structure and another stiffener member attached by welding to the central buoyancy tank structure may extend between the innermost ends of the two further stiffener members.

The tank plating preferably comprises a plurality of extruded stiffened planks seam-welded together along their longitudinal edges. The tank plating may be attached to the extruded beams of the buoyancy tank structure by welding or mechanical fastening means, but preferably is attached by welding at the bottom of the buoyancy tank structure and by mechanical fastening means at the top of the buoyancy tank structure.

Preferably the chine and gunwale members, the frame members, the stiffeners, the hull plating and the tank plating, are manufactured from light alloy, a weldable aluminium alloy suited for marine use being preferred.

The invention will now be further described by way of example and with reference to the accompanying drawings in which.

Figure 1:
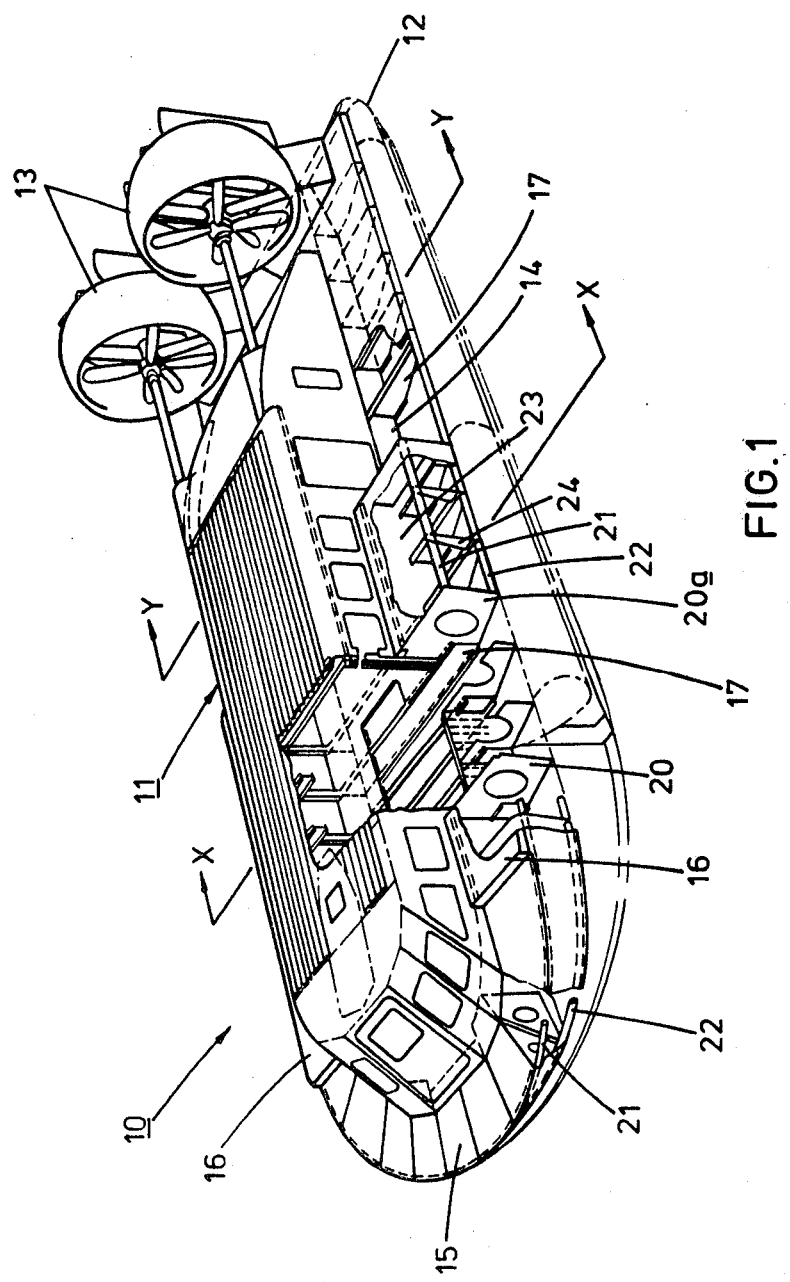
FIG. 1 is a perspective view of an A.C.V. in accordance with one embodiment of the invention shown broken away in a number of places to reveal features of the A.C.V. rigid body structure.
Figure 2:
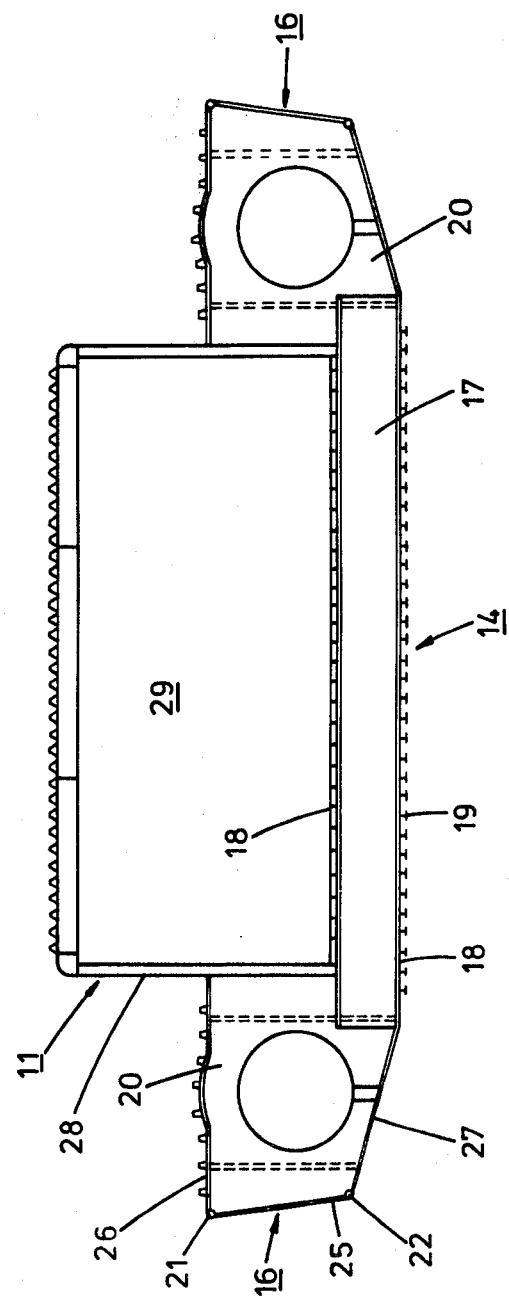
FIG. 2 is a transverse cross-section through the A.C.V. rigid body structure along line X—X of FIG. 1.
Figure 3:
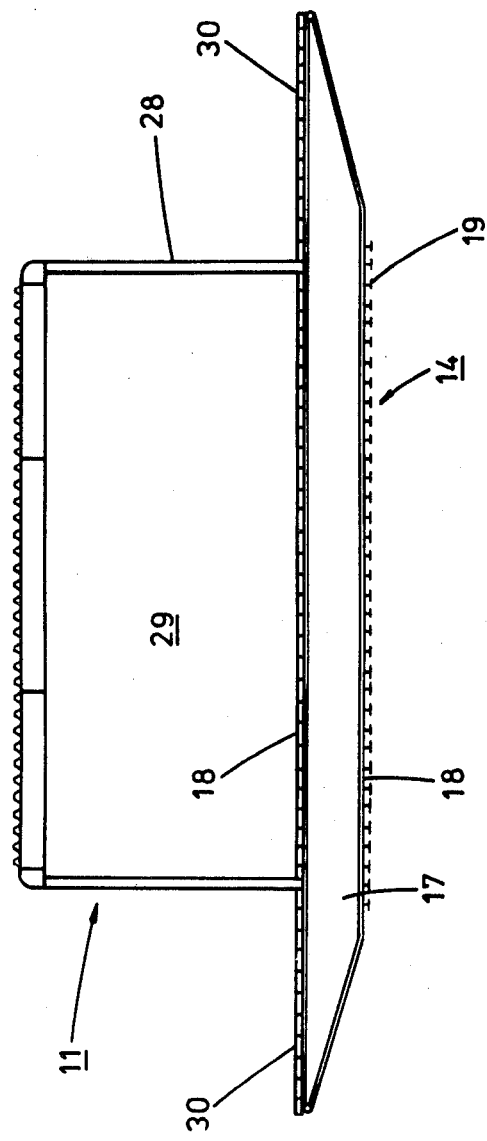
FIG. 3 is a transverse cross-section through the A.C.V. rigid body structure along line Y—Y of FIG. 1.

Referring first to FIGS. 1, 2 and 3 of the drawings, an amphibious A.C.V. 10 has a rigid body structure 11 manufactured principally from a weldable aluminium alloy which is suitable for use in a marine environment. A flexible skirt 12 of known bag and fingers construction, shown in broken line in FIG. 1 extending along only a part of one of the longitudinal sides of the A.C.V. 10, extends around and depends downwardly from the rigid body structure 11 to contain a cushion of pressurised air that in operation is formed between a ground surface and the underside of the rigid body structure 11. During operation the A.C.V. is propelled by two ducted propellers 13 located at the rear of the rigid body structure 11.

The rigid body structure 11 includes a rigid base formed as a buoyancy tank structure 14, a bow structure 15 attached to and extending outwardly from one end of the buoyancy tank structure 14, and side deck structures 16 attached to and extending outwardly from each longitudinal side of the buoyancy tank structure 14.

The buoyancy tank structure 14 comprises a plurality of unstiffened extruded beams 17 of deep I-section, which extend transversely of the buoyancy tank structure 14 and are spaced from each other throughout the length of the buoyancy tank structure. In this embodiment tank plating 18 forming the upper and lower surfaces of the buoyancy tank structure 14 comprises lengths of extruded aluminium plank stiffened by integral T-section stiffeners 19 which project from one side of the plank, lengths of extruded plank being seam-welded together along their longitudinal edges to form the tank plating 18. The tank plating 18 forming the top surface to the buoyancy tank structure 14 is attached to the extruded beams 17 by rivetting through the flanges of the T-section stiffeners 19 of the extruded plank and the flanges of the I-section extruded beams 17, whilst the tank plating 18 forming the bottom surface of the buoyancy tank structure 14 is attached to the extruded beams 17 by welding. The longitudinal sides of the buoyancy tank structure are closed by pieces of plating extending between welded attachment to the extruded beams 17 which pierce the closed longitudinal sides and project outwardly therefrom. The extruded beams 17 projecting from the forward portion of the longitudinal sides of the buoyancy tank structure are cut square and are attached to frame members 20 of deep section which project outwardly from the ends of the extruded beams 17 to support a tubular circular section gunwale member 21 and a tubular circular section chine member 22 welded, respectively, to the top and bottom outer corners of each frame member 20. Aft of the rearmost frame member 20a the projecting ends of the extruded beams 17 are tapered by inclining their lower edges upwardly to meet with the upper edge at the end of each beam which is attached by welding to the tubular chine member 22. The tubular chine member 22 extends over the full length of each longitudinal side of the A.C.V., whereas the tubular gunwale member 21 terminates at a sufficient distance aft of the rearmost frame member 20a as is necessary to provide a bay 23 for housing a diesel engine (not shown), which drives a lift fan (not shown) positioned forward of the engine bay 23 between the frame members 20. Over the length of the engine bay 23 the tubular gunwale member 21 is supported above the tubular chine member 22 by pillar members 24.

That part of the side deck structure 16 extending forward of the rear end of the engine bay 23 is comprised by the projecting ends of the extruded beams 17 and the tubular chine and gunwale members 21 and 22, respectively, and forward of the engine bay 23 further comprises the frame members 20. This part of the side deck structure 16 is completed by the addition of hull plating 25 extending between welded attachment to the tubular gunwale and chine members 21 and 22, respectively, hull plating 26 attached along an outer edge by welding to the tubular gunwale member 21 and extending inwardly over the top edges of the frame members 20 to attachment with the wall 28 of a cabin 29, and hull plating 27 extending from welded attachment along an outer edge to the tubular chine member 22 inwardly to welded attachment with the lower longitudinally extending edge of the tank plating 18 forming the bottom surface of buoyancy tank structure 14. Suitable hatches (not shown) are provided in the hull plating 26 for servicing and removal of the A.C.V. lift fans and lift fan diesel engines (not shown).

Aft of the rear end of the engine bay 23, the side deck structure 16 is comprised by the projecting tapered ends of the extruded beams 17 and the tubular chine member 22, and is completed by the addition of hull plating 30 which extends from welded attachment along an outer edge to the tubular chine member 22 inwardly over the tops of the extruded beams 17 to attachment with the wall 28 of the cabin 29.

Figure 4:
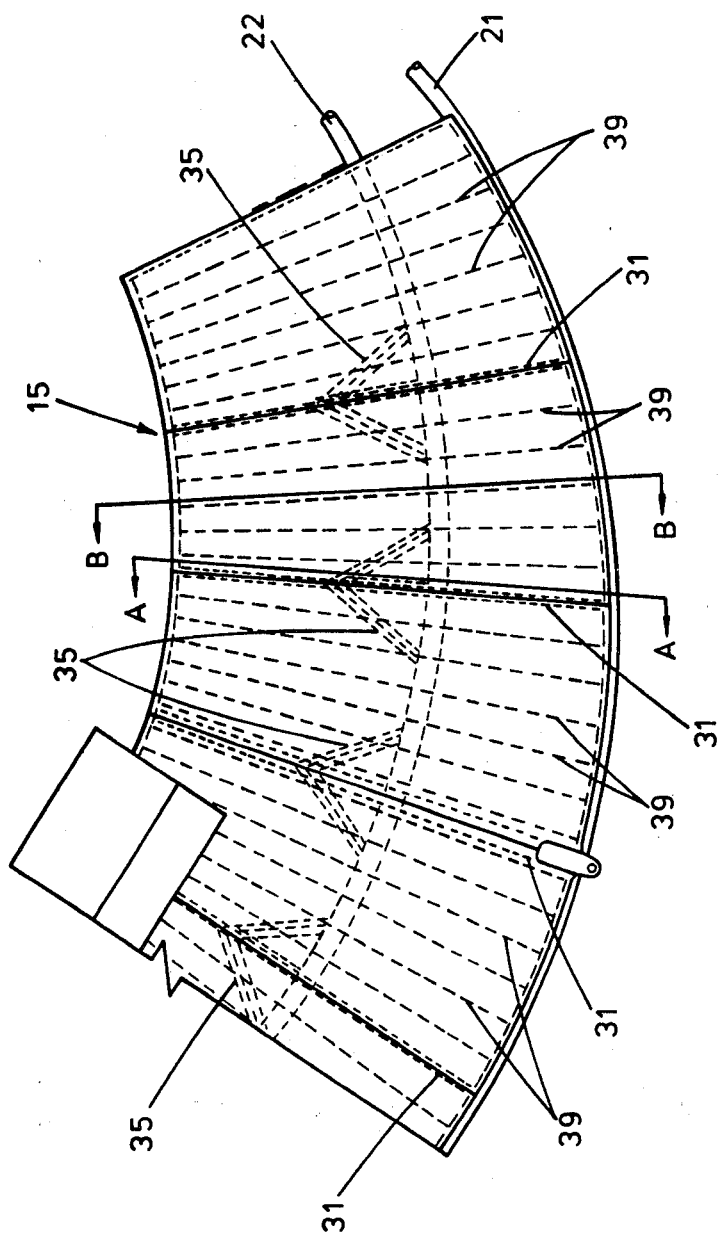
FIG. 4 is a top plan of a segment of the bow structure of the A.C.V. shown in FIG. 1 at one side of the A.C.V. longitudinal centreline.
Figure 5:
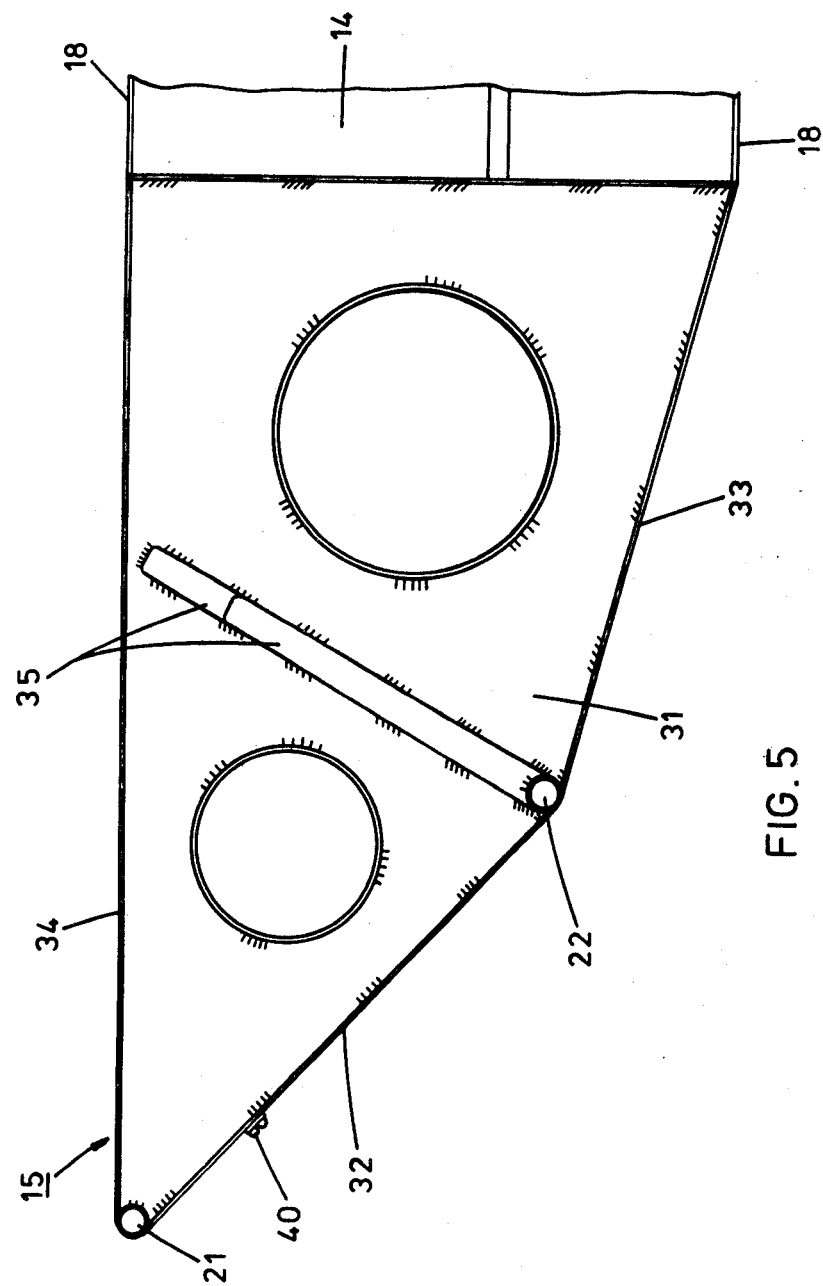
FIG. 5 is a section on line A—A in FIG. 4.
Figure 6:
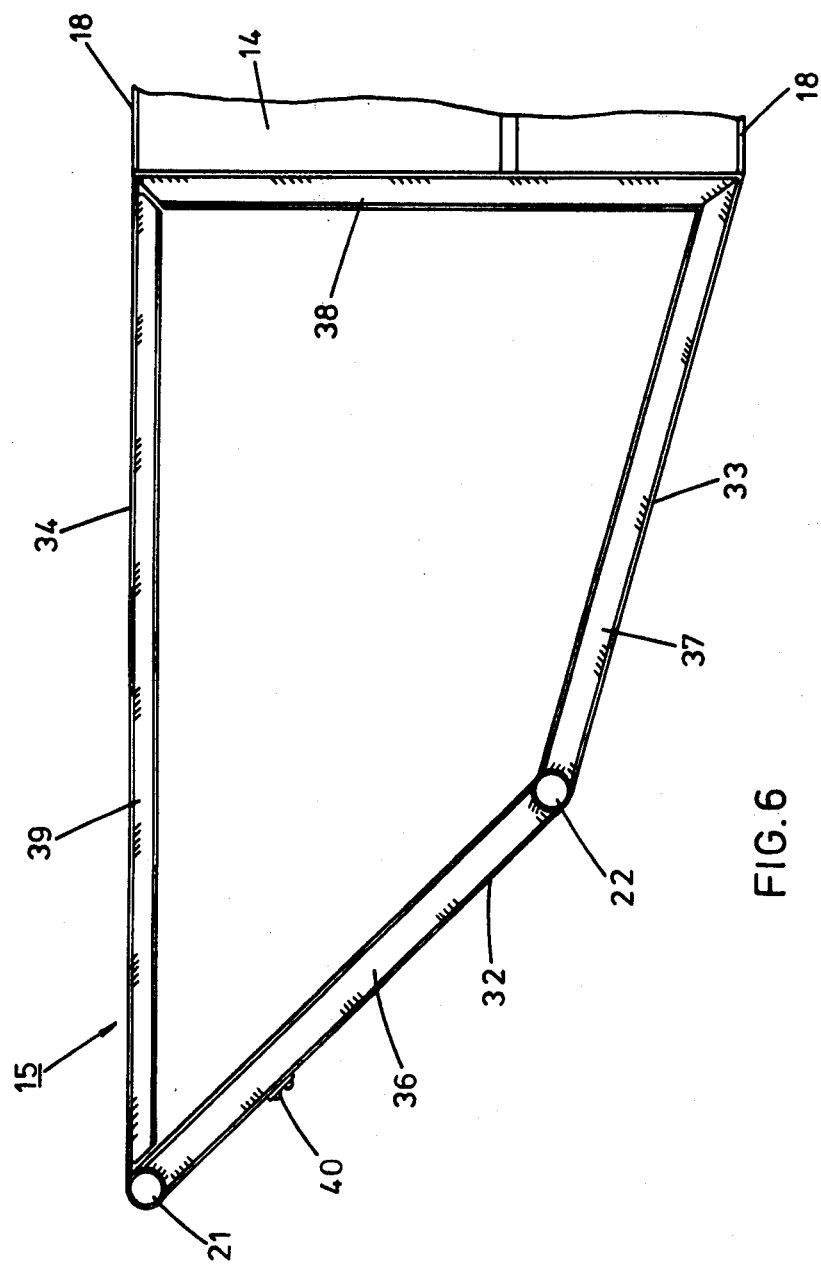
FIG. 6 is a section on line B—B in FIG. 4.

Referring now particularly to FIGS. 4, 5 and 6, the gunwale and chine members 21 and 22, respectively, extend from merger of the bow structure 15 with the side deck structures 16 in a continuous curve matching the curved planform of the bow structure. The curvature of the chine member 22 is such that it is disposed inwardly of the gunwale member 21 when the bow structure is viewed in plan so that the bow structure slopes downwardly and inwardly from the gunwale member 21 to the chine member 22. It will be appreciated that whilst the gunwale and chine members 21 and 22, respectively, are illustrated as being of one continuous length they will, in practice, each be manufactured by welding together a number of lengths of tube. Frame members 31 project radially outwardly from welded attachment on the front end of the buoyancy tank structure 14 and are welded to the gunwale and chine members 21 and 22, respectively. The bow structure is completed by hull plating 32 extending between welded attachment to the gunwale and chine members 21 and 22, respectively; by hull plating 33 extending between welded attachment to the chine member 22 and the front edge of the tank plating 18 forming the bottom surface of the buoyancy tank structure 14; and by hull plating 34 extending between welded attachment to gunwale member 21 and the front edge of the tank plating 18 forming the top surface of the buoyancy tank structure 14. The hull plating 33, 34, and 35, is also welded along the edges of the frame members 31.

The frame member 31 on the longitudinal centreline of the A.C.V. and the first two frame members 31 at each side of the longitudinal centreline, are each braced by three channel section members 35, one of which is attached to one side of the frame member 31 by welding along portions of the lengths of the edges of the side flanges of the member 35, whilst the other two members 35 are located one at either side of the frame member 31, each having one end attached by welding to the frame member 31 and extending outwardly at an acute angle therefrom to an opposite end which is similarly attached to the chine member 22.

Additional stiffener members are disposed between each pair of frame members 31 being comprised, as is shown in FIG. 6, by a stiffener member 36 extending between welded attachment at its ends to the gunwale member 21 and the chine member 22, a stiffener member 37 having one end attached by welding to the chine member 22 and extending inwardly to have its other end similarly attached to the lower forward end of a stiffener 38 which is welded to the front end of the buoyancy tank structure 14, and a stiffener 39 extending between an end which is adjacent to the gunwale member 21 and an end which is adjacent to the upper end of the stiffener 38, the stiffener 39 being attached by welding to the underside of the hull plating 34.

A row of skirt attachment hinge members 40 (reference FIGS. 5 and 6) are attached around the hull plating 32 of the bow structure 15 at a position below the gunwale member 21, and similar skirt attachment hinge members (not shown) are attached to the hull plating 25 of the side deck structures 16 at a position just above the chine member 22. These hinge members 40 provide means for attachment of the flexible skirt 12 to the A.C.V. in a manner similar to that described in U.K. Patent Specification No. 969,235 or U.K. Patent Specification No. 1,571,640.

One advantage of the present invention is that although the frame members 31 and the stiffeners 37 project at different angles from the front end of the buoyancy tank structure 14, the frame members 31 are provided with standard notches for receiving the tubular circular section gunwale and chine members 21 and 22, respectively. Also, that end of each stiffener member 37 which mates with the chine member 22, and the ends of each stiffener member 36, have standard profiles to suit the curvature of the gunwale and chine members. This results in a saving on the manufacturing cost of the frame and stiffener members, and the time required to build the bow structure is considerably reduced, giving further cost saving.

A further advantage is that an A.C.V. rigid body structure in accordance with the present invention lends itself to use of welding so that mechanically fastened joints are reduced, giving a saving in both weight and cost.

An added advantage of the present invention is that because the chine member is of tubular circular section it provides a smooth corner around which the skirt may fold as it flexes during operation of the A.C.V., and when it collapses as the A.C.V. sets down at the end of an operation. This reduces the rate of wear and damage brought about by the skirt coming into contact with sharp edges of the structure.

What is claimed is:

1. An amphibious air cushion vehicle having a rigid body structure including a rigid base formed as a buoyancy tank structure, a bow structure attached to and extending outwardly from one end of the buoyancy tank structure, side deck structures attached to and extending outwardly from each longitudinal side of the buoyancy tank structure, the bow structure and side deck structures each comprising a tubular circular section gunwale member and a tubular circular section chine member each supported outwardly from the buoyancy tank structure by frame members spaced from each other along at least a part of the length of the gunwale and chine members and attached thereto by welding, and hull plating attached to and supported by the gunwale, chine and frame members.

2. An A.C.V. as claimed in claim 1, wherein the tubular circular section chine member extends in a continuous length around the bow structure and along the complete length of each longitudinal side of the rigid body structure.

3. An A.C.V. as claimed in claim 1 or claim 2, wherein the tubular circular section gunwale member extends in a continuous length around the bow structure and along a part of the length of each longitudinal side of the rigid body structure.

4. An A.C.V. as claimed in claim 1, wherein the buoyancy tank structure comprises a plurality of unstiffened extruded beams of deep I-section extending transversely of the buoyancy tank structure and spaced from each other throughout the length of the buoyancy tank structure, and tank plating attached to the beams to form a closed box structure.

5. An A.C.V. as claimed in claim 4, wherein the ends of the beams project outwardly of tank plating forming the closed longitudinal sides of the buoyancy tank structure.

6. An A.C.V. as claimed in claim 5, wherein the ends of the beams in the forward half of the buoyancy tank structure are attached to the frame members of the side deck structure.

7. An A.C.V. as claimed in claim 5 or claim 6, wherein the ends of the beams in the rear half of the buoyancy tank structure are tapered towards their ends.

8. An A.C.V. as claimed in claim 1, wherein at least around the bow structure stiffener members disposed between each pair of frame members extend between welded attachment at their ends to the gunwale and chine members.

9. An A.C.V. as claimed in claim 8, wherein at the position of each of said extending stiffener member two further stiffener members extend one from the gunwale member and one from the chine member inwardly towards the central buoyancy tank structure and another stiffener member attached by welding to the central buoyancy tank structure extends between the innermost ends of said two further stiffener members.

10. An A.C.V. as claimed in claim 4, wherein the tank plating comprises a plurality of extruded stiffened planks seam-welded together along their longitudinal edges.

* * * * *